(12) United States Patent
Fukuwa

(10) Patent No.: US 6,742,889 B2
(45) Date of Patent: Jun. 1, 2004

(54) ATTACHABLE LENS MEMBER MOUNTING DEVICE, ATTACHABLE LENS MEMBER, AND SPECTACLES

(75) Inventor: Yasuo Fukuwa, Kanagawa (JP)

(73) Assignees: PENTAX Sales Co., Ltd., Tokyo (JP); PENTAX Corporation, Tokyo (JP)

( * ) Notice: Subject to any disclaimer, the term of this patent is extended or adjusted under 35 U.S.C. 154(b) by 0 days.

(21) Appl. No.: 10/291,582

(22) Filed: Nov. 12, 2002

(65) Prior Publication Data

US 2003/0090620 A1 May 15, 2003

(30) Foreign Application Priority Data

Nov. 9, 2001 (JP) ................................. P2001-344412

(51) Int. Cl.$^7$ ................................................ G02C 7/08

(52) U.S. Cl. ............................................ 351/57; 351/47

(58) Field of Search ............................... 351/47, 57

(56) References Cited

U.S. PATENT DOCUMENTS

| | | | |
|---|---|---|---|
| 4,196,981 A | 4/1980 | Waldrop | 351/47 |
| 5,568,207 A | 10/1996 | Chao | 351/57 |
| 5,642,177 A | 6/1997 | Nishioka | 351/47 |
| 5,737,054 A | 4/1998 | Chao | 351/47 |
| 5,980,036 A | 11/1999 | Solomon | 351/47 |
| 6,012,811 A | 1/2000 | Chao et al. | 351/47 |
| 6,092,896 A | 7/2000 | Chao et al. | 351/47 |
| 6,109,747 A | 8/2000 | Chao | 351/47 |
| 6,116,730 A | 9/2000 | Kwok | 351/57 |
| 6,139,141 A * | 10/2000 | Zider | 351/57 |
| 6,149,269 A | 11/2000 | Madison | 351/47 |
| 6,231,179 B1 | 5/2001 | Lee | 351/47 |
| 6,290,353 B1 * | 9/2001 | Chou | 351/47 |
| RE37,545 E | 2/2002 | Chao | 351/47 |
| 6,367,926 B1 | 4/2002 | Chao et al. | 351/47 |
| 6,375,321 B1 | 4/2002 | Lee et al. | 351/47 |
| 6,488,372 B1 * | 12/2002 | Park | 351/47 |
| 2003/0090620 A1 * | 5/2003 | Fukuwa | 351/47 |

FOREIGN PATENT DOCUMENTS

| | | |
|---|---|---|
| CH | 572222 | 1/1976 |
| DE | 85077615 | 5/1985 |
| DE | 88068986 | 10/1988 |
| DE | 3905041 | 8/1990 |
| DE | 3919489 | 12/1990 |
| DE | 3920879 | 1/1991 |
| DE | 39219879 | 1/1991 |
| DE | 39333108 | 1/1991 |
| FR | 1061253 | 4/1954 |
| JP | 9-101489 | 4/1997 |
| JP | 10186292 | 7/1998 |
| WO | WO90/09611 | 8/1990 |

OTHER PUBLICATIONS

English Language Translatio of German Appln. No. 88 06 898.6.

English Language Abstract of German Appln. No. 39 33 310.8.

(List continued on next page.)

*Primary Examiner*—Huy Mai

(74) *Attorney, Agent, or Firm*—Greenblum & Bernstein, P.L.C.

(57) ABSTRACT

In spectacles, endpieces are made of a magnetic substance. Attachable sunglasses are provided with mounting portions. The mounting portions include a wirelike member and a magnet holder. First and second attractive portions of the magnet holder are formed so as to be engaged with a corner formed by an upper surface and a front surface of one of the endpieces. A magnet is provided in the first and second attractive portions. The wirelike member is fixed to a rim of the sunglasses. The magnet holder is supported by the wirelike member. The sunglasses are mounted on the spectacles by attracting the first attractive portion to the upper surface and attracting the second attractive portion to the front surface by magnetic force.

12 Claims, 8 Drawing Sheets

OTHER PUBLICATIONS

English Language Abstract of German Appln. No. 39 21 987.9.
English Language Abstract of German Appln. No. 39 20 879.
English Language Abstract of German Appln. No. 39 19 489.
English Language Abstract of German Appln. No. 39 05 041.
English Language Translation of German Appln. No. 85 07 761.5.
English Language Abstract of Swiss Appl. No. 572,222.
English Language Translation of French Appln. No. 1,061,253.
"New Product Announcement Supporting Material: Questions and Answers of Pentax Magnet Eyeglass Frame", Sep. 26, 1995, along with an English Language Translation (distributed during Oct. 3–5, 1995 at the International Optical Fair in Tokyo, Japan).

"Easy Clip The New Magnetic Clip–On System" of Pentax, date unknown.

Documents describing Twincome in a Patent Opposition Proceeding in Germany initiated by PENTAX, on or around Apr. 30, 1997.

"Contour Optik" from www.contour–optik.com, and which appears to have been obtained from the Internet on Jan. 8, 1999.

Defendant's Motion For Summary Judgement, and Defendant's Memorandum In Support of Defendant's Motion For Summary Judgement, filed Apr. 8, 2003 in the litigation *Aspex Eyewear, Inc., et al.* v. *Concepts in Optics, Inc.* (U.S. District Court for the Southern District of Florida, Case No.: 00–CIV–7067, Memorandum Opinion and Order entered Aug. 11, 2003).

\* cited by examiner

ATTACHABLE LENS MEMBER MOUNTING DEVICE, ATTACHABLE LENS MEMBER, AND SPECTACLES

BACKGROUND OF THE INVENTION

1. Field of the Invention

The present invention relates to a mounting device of an attachable lens member which is attachable to and detachable from a spectacles frame.

2. Description of the Related Art

Conventionally, there is a type of attachable lens member mounting device, in which attachment lenses are hooked to a spectacles frame by hooks formed on the attachable lens member. Also, there is another type of attachable lens member mounting device in which magnets are used. Namely, magnets are provided on the endpieces of the spectacles and on the rim of the attachable lens member, so the attachable lens member is fixed on the frame of the spectacles by magnetic force.

However, in the former type of mounting device, the hooks of the attachable lens member are not securely attached to the frame of the spectacles. Therefore, the attachable lens member easily gets out of position or accidentally falls off the spectacles, if the attachable lens member is pushed or moved slightly. Further, if the mounting device is configured such that the attachable lens member is more fixedly mounted on the spectacles, the structure of the mounting device becomes complex and the attachable lens member is difficult to attach to and detach from the spectacles.

On the other hand, in the latter type of mounting device, the surfaces of the magnets are parallel to the surfaces of the lenses of the attachable lens member and the spectacles. Accordingly, if an external force parallel to the surfaces of the lenses is added to the attachable lens member, it easily gets out of position or falls off the spectacles.

SUMMARY OF THE INVENTION

Therefore, an object of the present invention is to provide an attachable lens member mounting device for spectacles in which the lens member is easily attached to and detached from the frame of the spectacles, and in which the lens member is attached securely enough to the frame of the spectacles to prevent the lens member from getting out of position or coming off the spectacles.

In accordance with an aspect of the present invention, there is provided an attachable lens member mounting device for spectacles, comprising: receiving portions on the spectacles, that are made of a magnetic substance; and mounting portions on the attachable lens member, that include at least two planes which are attracted to one of the receiving portions by magnetic force.

Preferably, the mounting portions are provided with at least one magnet in such a manner that one plane of the magnet can be in contact with a first plane, included on one of the receiving portions, which is positioned at an upper side when the spectacles are normally worn; and another plane of the magnet can be in contact with a second plane, included on one of the receiving portions, which is positioned at a front side when the spectacles are normally worn. The first plane and the second plane cross.

In accordance with another aspect of the present invention, there is provided an attachable lens member mounting device for spectacles comprising: receiving portions on the spectacles, that are made of a magnetic substance; and mounting portions on the attachable lens member, that are provided at positions which correspond to the receiving portions in a state in which the attachable lens member is mounted on the spectacles. The mounting portions include: a first attractive portion which is in contact with a first receiving portion of the spectacles which is approximately horizontal when the spectacles are normally worn; and a second attractive portion which is in contact with a second receiving portion of the spectacles which is approximately vertical when the spectacles are normally worn. A first magnet is provided in the first attractive portion, and a second magnet is provided in the second attractive portion.

Preferably, the first attractive portion and the second attractive portion are unitarily formed.

Preferably, the contact plane of the first attractive portion and a plane of the first magnet form approximately one plane, and the contact plane of the second attractive portion and a plane of the second magnet form approximately one plane.

Preferably, each of the mounting portions is held by a wirelike member which is fixed on a rim of the attachable lens member.

In accordance with another aspect of the present invention, there is provided an attachable lens member which is mounted on the magnetic receiving portions of spectacles, comprising: mounting portions that are provided at positions which correspond to the receiving portions when the lens member is mounted on the spectacles, and that are formed so as to be engaged with a corner at which an upper surface and a front surface of the receiving portions cross. The upper surface is positioned at an upper side and the front surface is positioned at a front side when the spectacles are normally worn.

Magnets are provided at planes, of the mounting portions, which are respectively in contact with the upper surface and the front surface.

In accordance with another aspect of the present invention, there is provided spectacles on which an attachable lens member can be mounted comprising receiving portions that are made of a magnetic substance.

BRIEF DESCRIPTION OF THE DRAWINGS

The objects of the present invention will be better understood from the following description, with reference to the accompanying drawings, in which.

DESCRIPTION OF THE PREFERRED EMBODIMENTS

Figure 1:
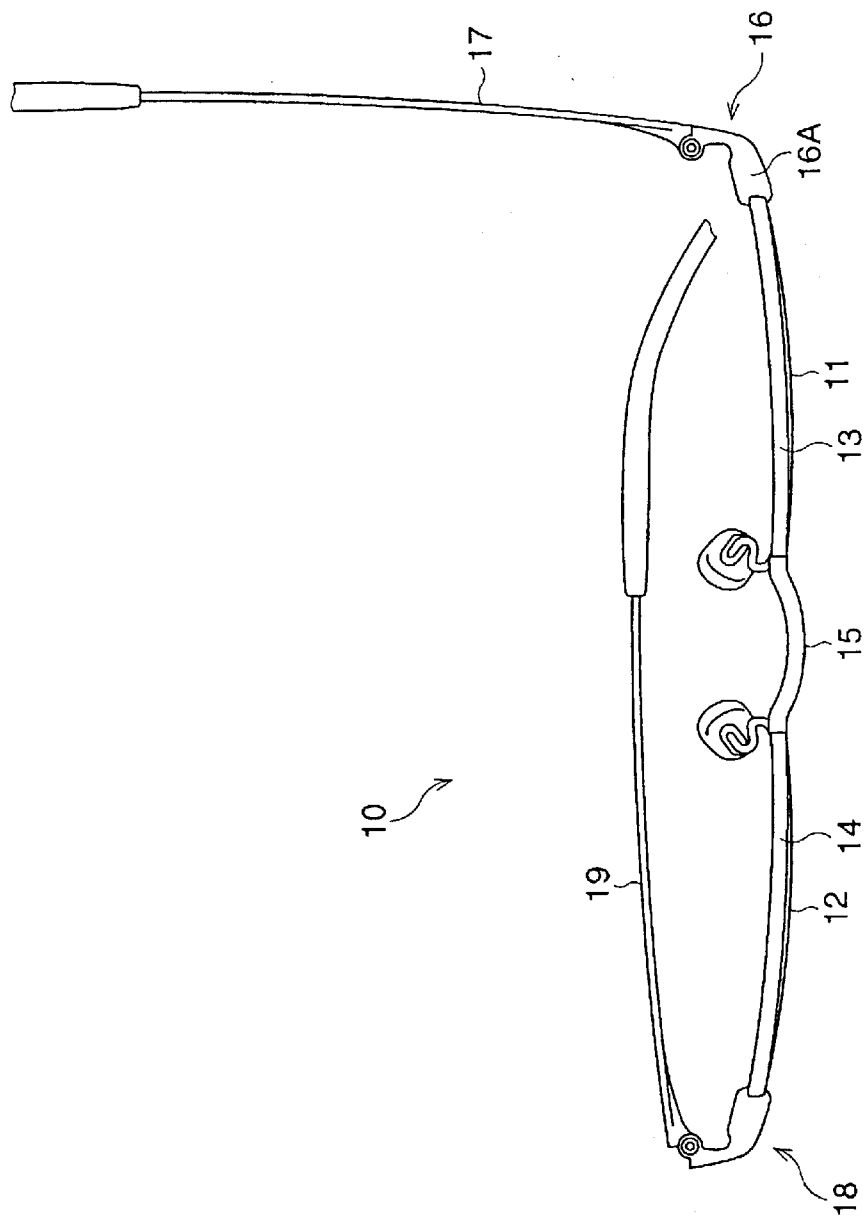
FIG. 1 is a plan view of spectacles, to which an embodiment, according to the present invention, is applied.

The present invention will now be described with reference to an embodiment shown in the drawings.

Figure 2:
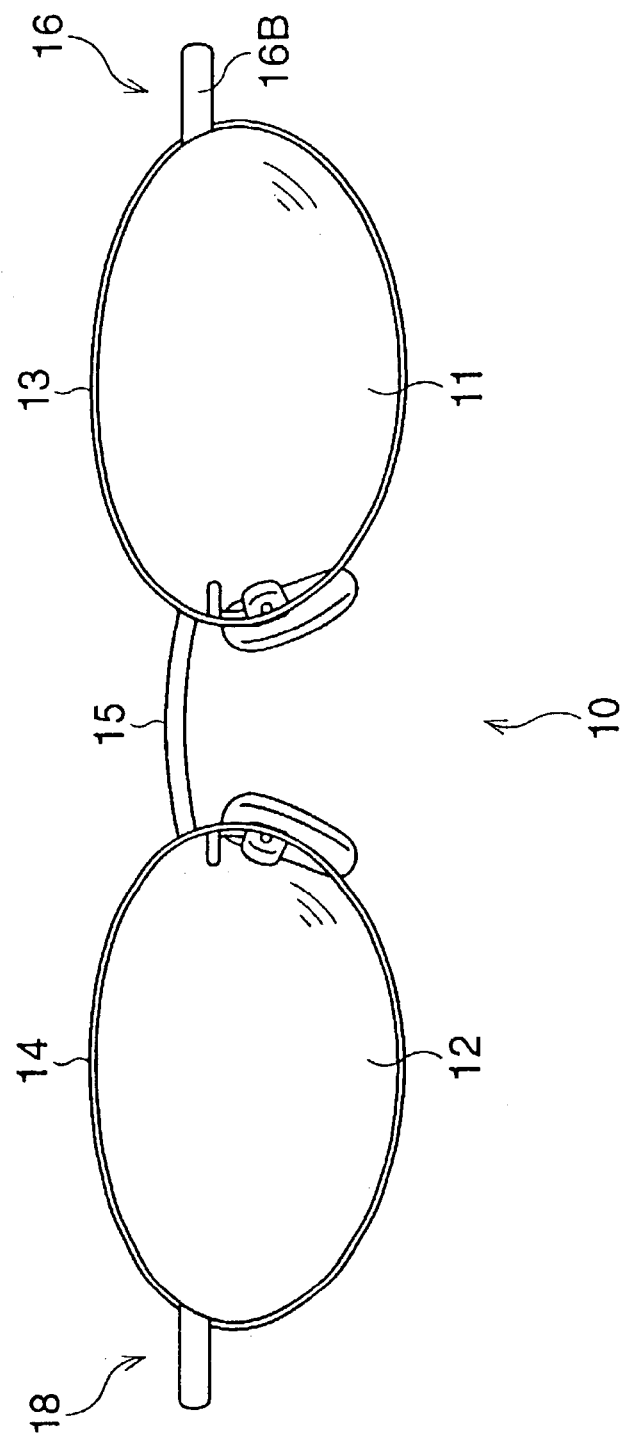
FIG. 2 is a front view of the spectacles.

FIG. 1 is a plan view of spectacles 10, to which an embodiment according to the present invention is applied, and FIG. 2 is a front view of the spectacles 10. The spectacles 10 include lenses 11 and 12 which are respectively held by rims 13 and 14. The rims 13 and 14 are connected by a bridge 15. The rim 13 is connected to a temple 17 through an endpiece 16, and the rim 14 is connected to a temple 19 through an endpiece 18. The endpieces 16 and 18 are made of a magnetic substance.

Figure 3:
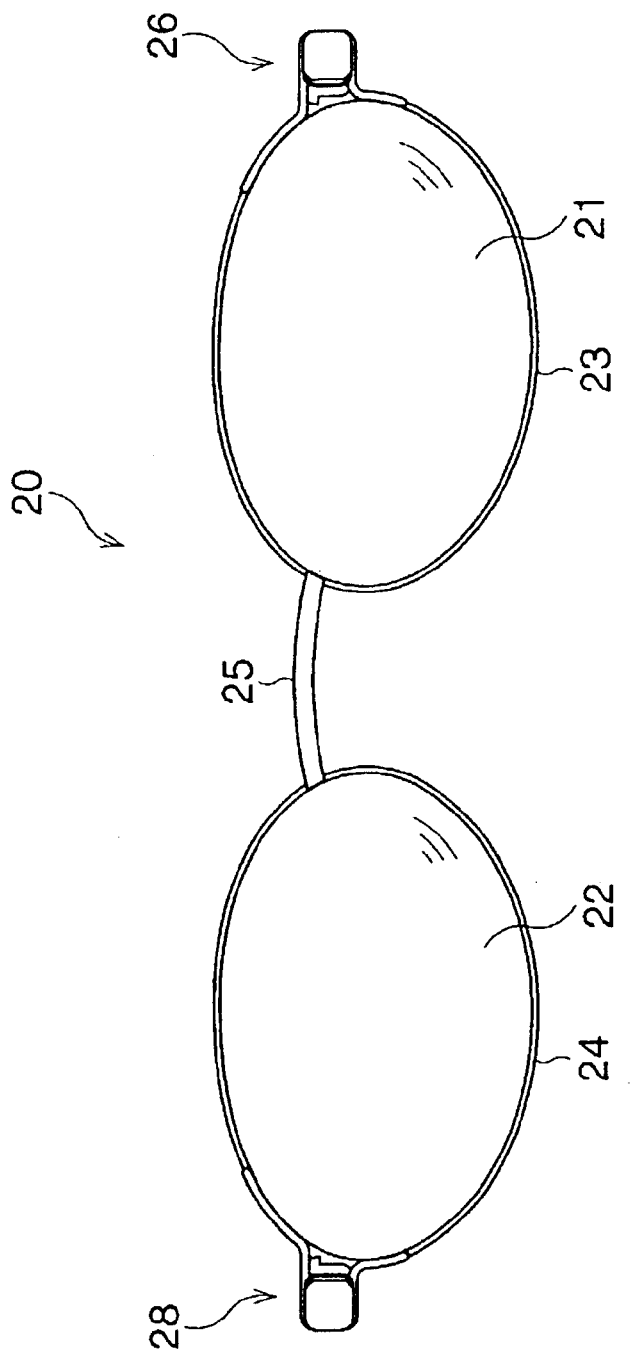
FIG. 3 is a front view of an attachable lens member to which the embodiment is applied.
Figure 4:
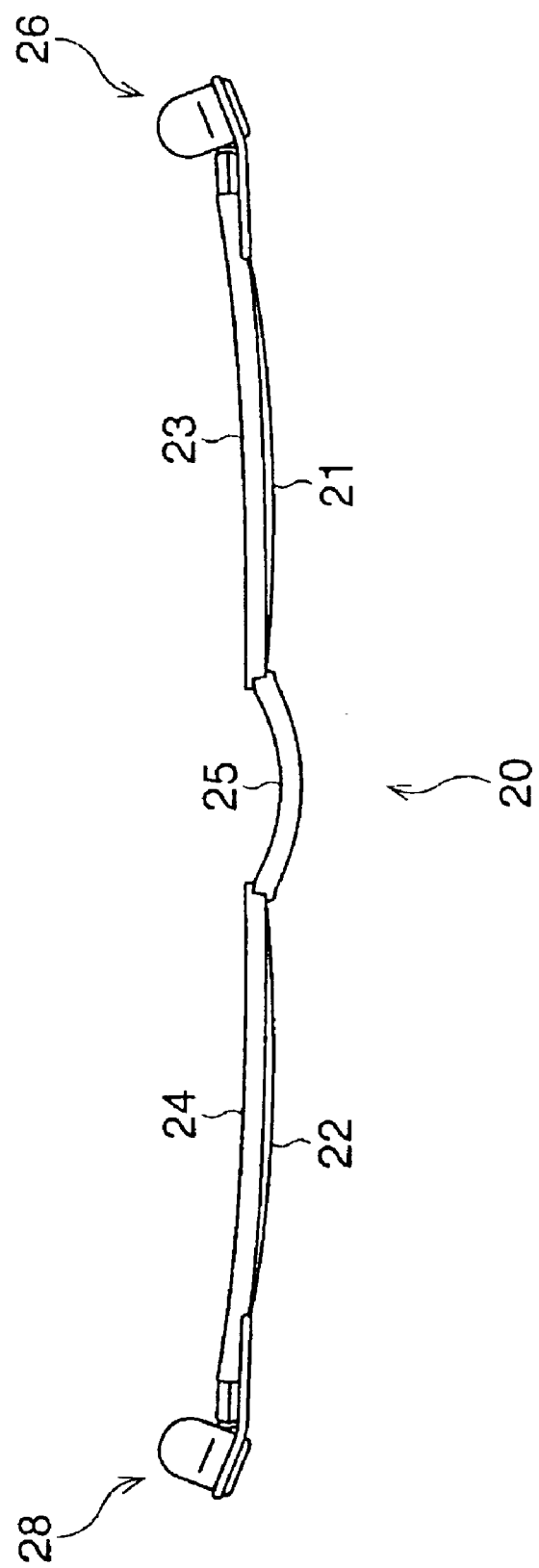
FIG. 4 is a plan view of the lens member.

FIG. 3 is a front view of an attachable lens member to which the embodiment is applied, and FIG. 4 is a plan view of the lens member. In this specification, a lens member is an accessory which is detachably mounted to spectacles, and includes lenses and a front frame which supports the lenses. The lenses may be optical members which do not have optical power. Further, the lenses may be colored or not colored.

In this embodiment, the attachable lens member is a pair of attachment sunglasses 20. The sunglasses 20 include colored lenses 21 and 22, rims 23 and 24, and a bridge 25. The lenses 21 and 22 are respectively held by the rims 23 and 24. The rims 23 and 24 are connected by the bridge 25. At the rim 23, a mounting portion 26 is provided on the side opposite to the bridge 25, and at the rim 24, a mounting portion 28 is provided on the side opposite to the bridge 25. The mounting portions 26 and 28 are members for mounting the sunglasses 20 on the above-mentioned spectacles 10.

Figure 5:
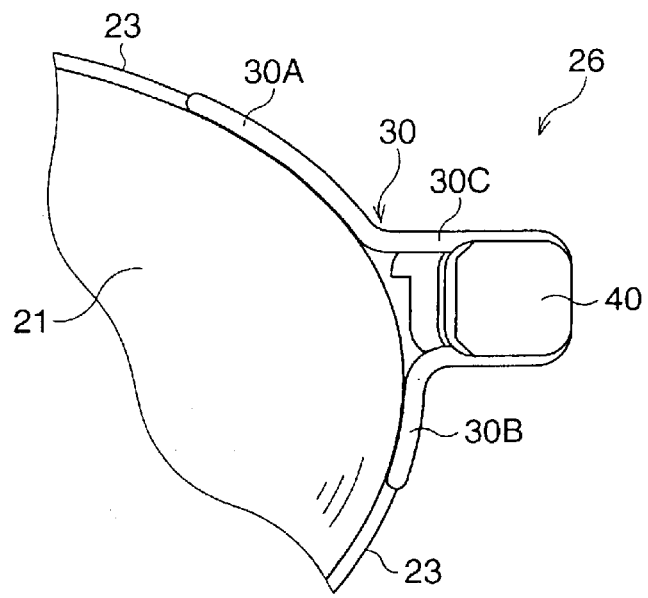
FIG. 5 is an enlarged front view of a mounting portion.
Figure 6:
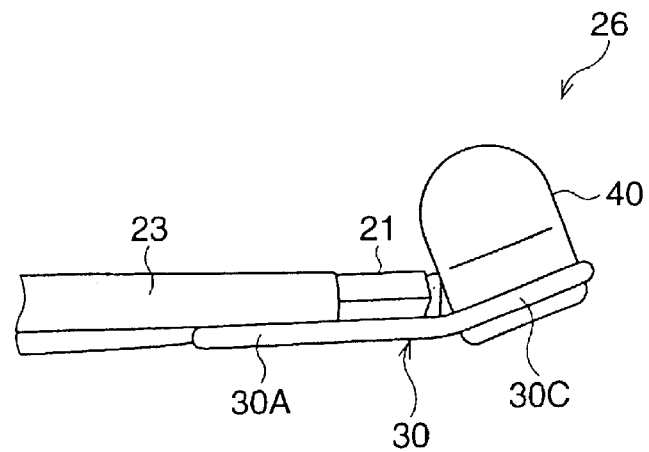
FIG. 6 is an enlarged plan view of the mounting portion.

FIGS. 5 and 6 are enlarged views of the mounting portion 26. In FIG. 5, the mounting portion 26 is depicted on the same side as depicted in FIG. 3. Also, in FIG. 6, the mounting portion 26 is depicted on the same side as depicted in FIG. 4. The mounting portion 26 is provided at a position which corresponds to the endpiece 16. The mounting portion 26 includes a wirelike member 30 which is fixed to the rim 23 and a magnet holder 40 which is supported by the wirelike member 30. The wirelike member 30 includes fixing portions 30A and 30B, and a supporting portion 30C which connects the fixing portions 30A and 30B. The fixing portions 30A and 30B are fixed at the front side of the rim 23. Namely, when the sunglasses 20 are mounted on the spectacles 10, the fixing portions 30A and 30B are positioned at the side opposite to the spectacles 10. The supporting portion 30C is bent so as to form an approximately rectangular shape. The supporting portion 30C extends in the direction opposite to the bridge 25, being approximately parallel to the surface of the lens 21. Namely, the supporting portion 30C projects outwards. The magnet holder 40 is supported by the supporting portion 30C.

Figure 7:
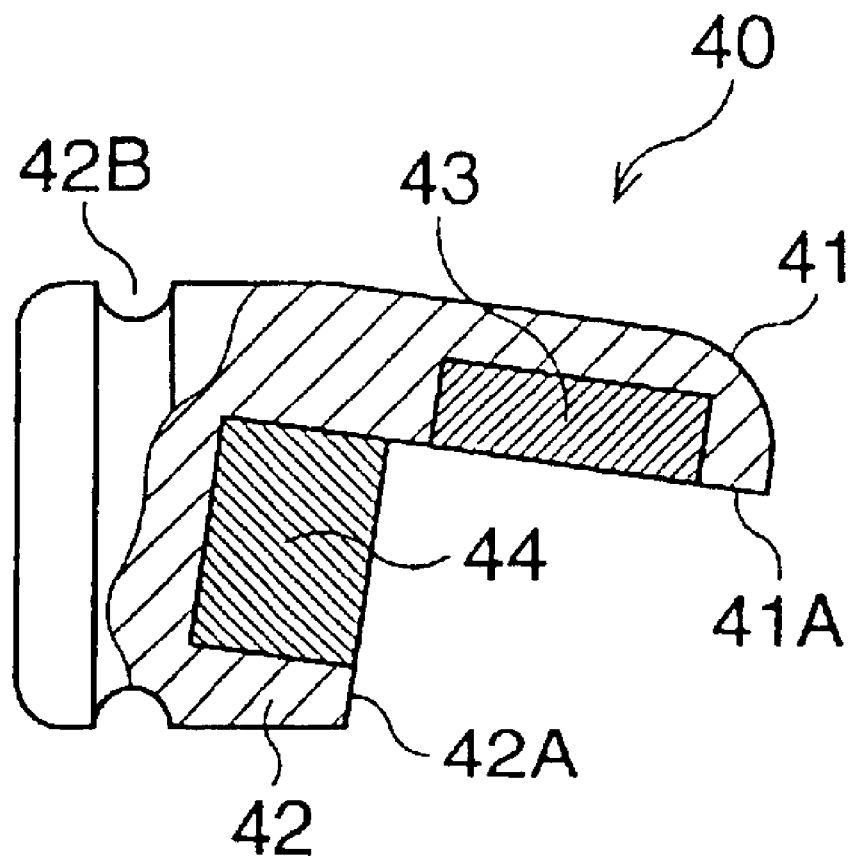
FIG. 7 is an enlarged view, partially in cross-section, of a magnet holder.

FIG. 7 is an enlarged view, partially in cross-section, of the magnet holder 40. In FIG. 7, the magnet holder 40 is depicted at the right side of FIG. 5. The magnet holder 40 includes a first attractive portion 41 and a second attractive portion 42. The first attractive portion 41 includes a contact plane 41A. The second attractive portion 42 includes a contact plane 42A. When the magnet holder 40 is supported by the supporting portion 30C, the contact plane 41A extends in the direction perpendicular to the surface of the lens 21, and the contact plane 42A is approximately parallel to the surface of the lens 21.

Namely, the magnet holder 40 is arranged so as to be engaged with a corner at which the sides 16A (see FIG. 1) and 16B (see FIG. 2) of the endpiece 16 cross. Note that, the side 16A is an upper side and the side 16B is a front side when the spectacles 10 are normally worn. Namely, the side 16A is approximately horizontal and the side 16B is approximately vertical when the spectacles 10 are normally worn.

While the sunglasses 20 are mounted on the spectacles 10, the contact plane 41A is in contact with the upper plane 16A (first receiving portion), and the contact plane 42A is in contact with the front plane 16B (second receiving portion).

A magnet 43 is provided in the first attractive portion 41, and a magnet 44 is provided in the second attractive portion 42. The magnet 43 is situated such that its uncovered plane and the contact plane 41A form approximately one plane. The magnet 44 is situated such that its uncovered plane and the contact plane 42A form approximately one plane. Further, at the outer surface of the second attractive portion 42, a groove 42B with which the supporting portion 30C (see FIGS. 5 and 6) of the wirelike member 30 is engaged, is formed all around the outer surface.

Note that, the endpiece 18 and the mounting portion 28 have the same constructions as the endpiece 16 and the mounting portion 26.

Figure 8:
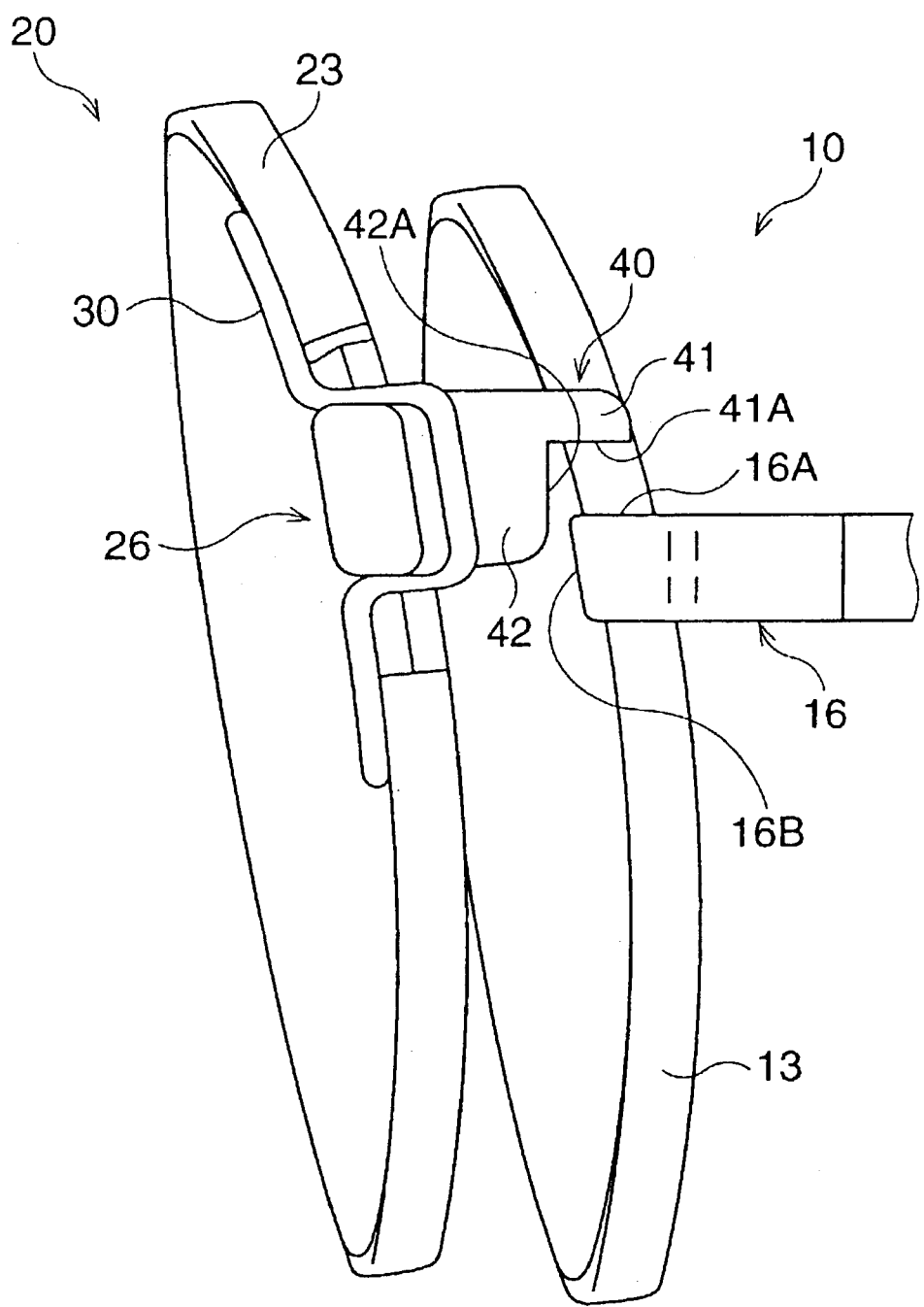
FIG. 8 is a perspective view which shows a situation in which the attachable lens member is going to be mounted on the spectacles.

As shown in FIG. 8, the attachment sunglasses 20 can be mounted on the spectacles 10 by approaching the mounting portion 26 to the endpiece 16 so that the contact plane 41A corresponds to the upper side 16A and the contact plane 42A corresponds to the front side 16B. As described above, since the endpiece 16 is made of a magnetic substance, the magnet holder 40 can be easily attracted to the endpiece 16 by magnetic force. With respect to the endpiece 18 and the mounting portion 28, similar manipulation is carried out. Further, the sunglasses 20 can be taken off from the spectacles 10 by removing the mounting portion 26 (28) from the endpiece 16 (18) against the attractive force of the magnetic force.

Figure 9:
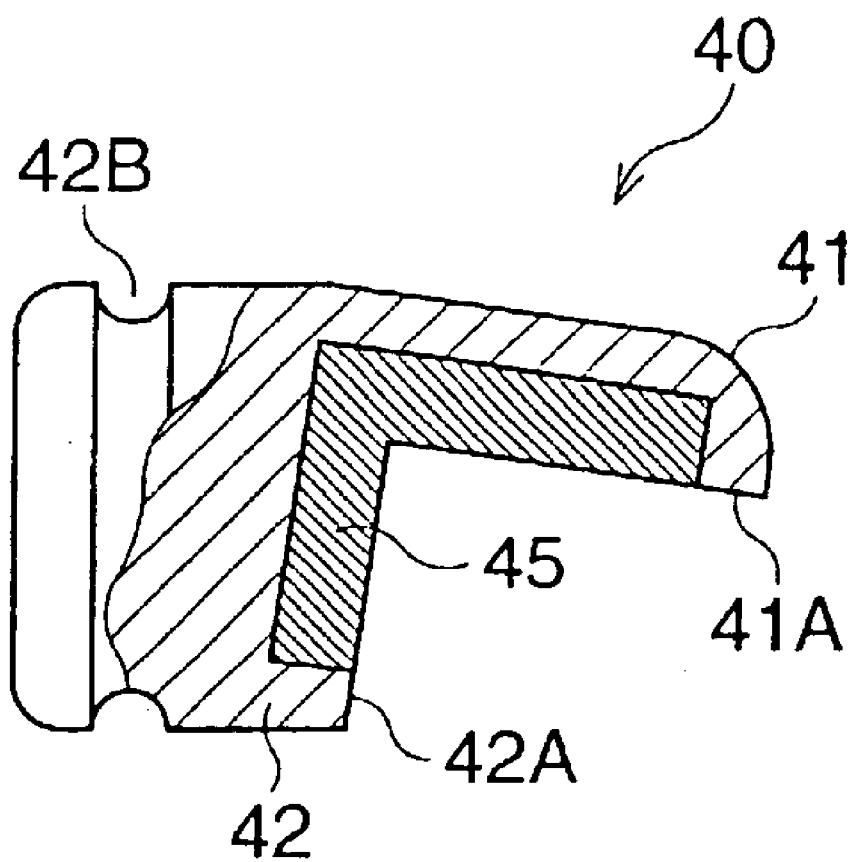
FIG. 9 is an enlarged view, partially in cross-section, of a modification of the magnet holder.

Note that, as shown in FIG. 9, in the magnet holder 40, a single magnet 45 can be used in place of the magnets 43 and 44. For the magnet 45, two crossing thin plate portions, which correspond to the magnets 43 and 44, are formed unitarily. The sectional shape of the magnet 45 is L-figured. The magnet 45 is situated such that the two thin plate portions are positioned at the first and second attractive portions 41 and 42. The sunglasses 20, including the magnet holder 40 which is provided with the magnet 45, can be mounted on the spectacles 10 by manipulation similar to the above-described manipulation.

As described above, according to this embodiment, the sunglasses 20 can be mounted on the spectacles 10 by contacting the mounting portions 26 and 28 of the sunglasses 20 with the endpieces 16 and 18 of the spectacles 10. Accordingly, the sunglasses 20 easily attach to and detach from the spectacles 10.

Further, the mounting portions 26 and 28 are attracted by magnetic force through the two crossing planes of the endpieces 16 and 18. Accordingly, the sunglasses 20 are prevented from easily and undesirably coming off the spectacles 10.

Further, according to this embodiment, the sunglasses 20 are attached to the spectacles 10 only by making the endpieces 16 and 18 out of a magnetic substance. Namely, it is unnecessary to add an extra mechanism in order to additionally mount the sunglasses 20. Accordingly, the manufacturing of the spectacles 10 is facilitated.

Note that, in the embodiment, the attachable lens member includes the attachment sunglasses. However, positive or negative lenses can be used as lenses in the attachable lens member. Spectacles including negative lenses are used for presbyopia by combining a lens member having positive lenses. Namely, the spectacles can be used as glasses for both myopia and presbyopia.

As described above, according to the present invention, a mounting device, in which the attachment and detachment of the lens member is easily carried out, and in which the lens member is securely mounted on the spectacles so that it does not easily and undesirably come off the spectacles, can be obtained.

The present disclosure relates to subject matter contained in Japanese Patent Application No. 2001-344412 (filed on Nov. 9, 2001) which is expressly incorporated herein, by reference, in its entirety.

What is claimed is:

1. An attachable lens member mounting device for spectacles comprising:

receiving portions on said spectacles, that are made of a magnetic substance, each said receiving portion including a front side which faces forwardly when said spectacles are normally worn and an upper side which faces upwardly when said spectacles are normally worn; and mounting portions on an attachable lens member, each said mounting portion including a magnet having at least two planes which are attracted to one of said receiving portions by magnetic force, said at least two planes substantially perpendicular to each other and configured such that a first one of said planes attaches to said front side of said one of said receiving portions and a second one of said planes attaches to said upper side of said one of said receiving portions.

2. The attachable lens member mounting device according to claim 1, wherein each of said mounting portions is held by a wirelike member which is fixed on a rim of the attachable lens member.

3. The attachable lens member mounting device according to claim 1, wherein said receiving portions are positioned at side end portions of said spectacles.

4. An attachable lens member mounting device for spectacles comprising:

receiving portions on said spectacles, that are made of a magnetic substance; and mounting portions on an attachable lens member, that are provided at positions which correspond to said receiving portions in a state in which said attachable lens member is mounted on said spectacles, wherein said mounting portions include:

a first attractive portion defining a first plane and which is in contact with a first receiving portion of said spectacles which faces upwardly and is approximately horizontal when said spectacles are normally worn; and a second attractive portion defining a second plane and which is in contact with a second receiving portion of said spectacles which faces forwardly and is approximately vertical when said spectacles are normally worn, and a first magnet is provided in said first attractive portion, and a second magnet is provided in said second attractive portion, said first and second planes substantially perpendicular to each other and configured such that said first plane attaches to said first receiving portion and said second plane attaches to said second receiving portion.

5. The attachable lens member mounting device according to claim 4, wherein said first attractive portion and said second attractive portion are unitarily formed.

6. The attachable lens member mounting device according to claim 4, wherein the contact plane of said first attractive portion and a plane of said first magnet form approximately one plane, and the contact plane of said second attractive portion and a plane of said second magnet form approximately one plane.

7. The attachable lens member mounting device according to claim 4, wherein each of said mounting portions is held by a wirelike member which is fixed on a rim of the attachable lens member.

8. The attachable lens member mounting device according to claim 4, wherein said receiving portions are positioned at side end portions of said spectacles.

9. An attachable lens member which is mounted on the receiving portions of spectacles, which are made of a magnetic substance comprising:

mounting portions that are provided at positions which correspond to said receiving portions when said lens member is mounted on said spectacles, and that are formed so as to be engaged with a corner at which an upper surface and a front surface of said receiving portions cross, said upper surface being positioned at an upper side and said front surface being positioned at a front side when said spectacles are normally worn, wherein magnets are provided at planes, of said mounting portions, which are respectively in contact with said upper surface and said front surface, said planes substantially perpendicular to each other and configured such that a first one of said planes attaches to said front surface of said one of said receiving portions and a second one of said planes attaches to said upper surface of said one of said receiving portions.

10. The attachable lens member according to claim 9, wherein said receiving portions are positioned at side end portions of said spectacles.

11. Spectacles on which an attachable lens member can be mounted comprising receiving portions that are made of a magnetic substance, each said receiving portion including a front side which faces forwardly when said spectacles are normally worn and an upper side which faces upwardly when said spectacles are normally worn; and said receiving portions configured for having mounted thereon mounting portions on an attachable lens member, each mounting portion including a magnet having at least two planes which are attracted to one of said receiving portions by magnetic force, the at least two planes substantially perpendicular to each other and configured such that a first one of the planes attaches to said front side of said one of said receiving portions and a second one of the planes attaches to said upper side of said one of said receiving portions.

12. The spectacles according to claim 11, wherein said receiving portions are positioned at side end portions of said spectacles.

* * * * *